(12) United States Patent
Haenen et al.

(10) Patent No.: US 9,995,438 B2
(45) Date of Patent: Jun. 12, 2018

(54) LED LIGHTING DEVICE WITH LOWER HEAT DISSIPATING STRUCTURE

(75) Inventors: Ludovicus Johannes Lambertus Haenen, Sint Oedenrode (NL); Silvia Maria Booij, Eindhoven (NL); Huib Cooijmans, Son en Breugel (NL); Georges Marie Calon, Eindhoven (NL)

(73) Assignee: Lumileds LLC, San Jose, CA (US)

(*) Notice: Subject to any disclaimer, the term of this patent is extended or adjusted under 35 U.S.C. 154(b) by 62 days.

(21) Appl. No.: 14/114,239

(22) PCT Filed: Apr. 23, 2012

(86) PCT No.: PCT/IB2012/052035
§ 371 (c)(1),
(2), (4) Date: Oct. 28, 2013

(87) PCT Pub. No.: WO2012/147026
PCT Pub. Date: Nov. 1, 2012

(65) Prior Publication Data
US 2014/0055998 A1    Feb. 27, 2014

(30) Foreign Application Priority Data
Apr. 29, 2011 (EP) ................................ 11305510

(51) Int. Cl.
*F21V 21/00* (2006.01)
*F21K 99/00* (2016.01)
(Continued)

(52) U.S. Cl.
CPC ............... *F21K 9/50* (2013.01); *F21K 9/232* (2016.08); *F21K 9/60* (2016.08); *F21V 29/713* (2015.01);
(Continued)

(58) Field of Classification Search
CPC ........ F21K 9/135; F21K 9/232; F21V 29/505; F21V 29/77; F21V 29/83; F21V 29/767;
(Continued)

(56) References Cited

U.S. PATENT DOCUMENTS 6,796,698 B2 *   9/2004   Sommers .............. F21V 7/041
                                                340/815.45
7,683,772 B2 *   3/2010   Smith .................. B60Q 1/2607
                                                315/292
(Continued)

FOREIGN PATENT DOCUMENTS

CN          2699115 Y       5/2005
CN        201028444 Y       2/2008
(Continued)

OTHER PUBLICATIONS

Diamantidis Georg, Illuminant, Oct. 23, 2008, WO2008125191, English translation.*
(Continued)

*Primary Examiner* — Bryon T Gyllstrom
*Assistant Examiner* — James Endo (57) ABSTRACT

A lighting device, or LED lamp is described with a base element for electrical contacting and mechanical mounting and an LED arrangement with at least one LED element. The LED arrangement is spaced from the base element along a longitudinal axis. In order to provide a lighting device and a lighting arrangement with a matched optical and thermal design, i.e. where both effective heat dissipation and an advantageous light intensity distribution are achieved, a lower heat dissipating structure is arranged between the base element and the LED arrangement. The lower heat dissipating structure includes a plurality of planar heat dissipation elements made out of a heat conducting material, shaped to have at a first longitudinal position along the longitudinal axis a first extension in cross-section, and at a second
(Continued)

longitudinal position a second extension in cross-section. The first longitudinal position is arranged closer to the LED arrangement than the second longitudinal position, and the first extension is smaller than the second extension in order to minimize obstruction of light emitted from the LED arrangement.

17 Claims, 6 Drawing Sheets

(51) Int. Cl.
| | |
|---|---|
| F21V 29/71 | (2015.01) |
| F21V 29/75 | (2015.01) |
| F21V 29/76 | (2015.01) |
| F21K 9/232 | (2016.01) |
| F21K 9/60 | (2016.01) |
| F21V 29/505 | (2015.01) |
| F21V 29/77 | (2015.01) |
| F21V 29/83 | (2015.01) |
| F21V 29/89 | (2015.01) |
| F21Y 115/10 | (2016.01) |
| F21Y 107/00 | (2016.01) |
| F21V 29/00 | (2015.01) |

(52) U.S. Cl.
CPC .............. *F21V 29/75* (2015.01); *F21V 29/76* (2015.01); *F21V 29/2212* (2013.01); *F21V 29/505* (2015.01); *F21V 29/77* (2015.01); *F21V 29/83* (2015.01); *F21V 29/89* (2015.01); *F21Y 2107/00* (2016.08); *F21Y 2115/10* (2016.08); *Y02B 20/30* (2013.01)

(58) Field of Classification Search
CPC .... F21V 29/777; F21V 29/773; F21V 29/713; F21V 29/745; F21V 29/75; F21V 29/2212; F21S 48/328; F21Y 2111/007
USPC ........ 362/545, 237, 235, 249.1, 255; 313/46
See application file for complete search history.

(56) References Cited

U.S. PATENT DOCUMENTS

| | | | |
|---|---|---|---|
| 7,771,082 B2 | 8/2010 | Peng et al. | |
| 2003/0214810 A1* | 11/2003 | Zhang | F21S 48/328 362/294 |
| 2003/0227774 A1* | 12/2003 | Martin | F21K 9/00 362/240 |
| 2007/0097692 A1* | 5/2007 | Suehiro | F21K 9/00 362/294 |
| 2007/0177392 A1* | 8/2007 | Grigorik | F21S 8/033 362/382 |
| 2009/0225555 A1 | 9/2009 | Ghim et al. | |
| 2010/0187964 A1* | 7/2010 | Thurgood | F21V 19/0015 313/46 |
| 2010/0213809 A1* | 8/2010 | Roehl | F21S 48/1159 313/46 |
| 2010/0264799 A1* | 10/2010 | Liu | F21V 29/006 313/46 |
| 2010/0271823 A1* | 10/2010 | Huang | F21K 9/00 362/249.02 |
| 2010/0289407 A1* | 11/2010 | Anderson | F21V 3/02 315/35 |
| 2011/0013413 A1* | 1/2011 | Yang | F21K 9/135 362/545 |
| 2011/0018417 A1* | 1/2011 | Lai | F21V 29/004 313/46 |
| 2011/0050101 A1 | 3/2011 | Bailey et al. | |
| 2011/0080096 A1 | 4/2011 | Dudik et al. | |
| 2011/0181166 A1 | 7/2011 | Chen et al. | |
| 2011/0285267 A1* | 11/2011 | Lu | F21K 9/00 313/46 |
| 2011/0310608 A1* | 12/2011 | Lapatovich | F21K 9/00 362/249.02 |
| 2012/0013237 A1* | 1/2012 | Lee | F21K 9/135 313/46 |
| 2012/0194054 A1* | 8/2012 | Johnston | H01J 7/24 313/46 |
| 2014/0043823 A1 | 2/2014 | Liu et al. | |

FOREIGN PATENT DOCUMENTS

| | | | | |
|---|---|---|---|---|
| CN | 201386989 Y | 1/2010 | | |
| CN | 101839415 A | 9/2010 | | |
| CN | 102003647 A | 4/2011 | | |
| DE | 202008006327 U1 | 7/2008 | | |
| DE | 102007017900 A1 | 10/2008 | | |
| EP | 1876384 A2 | 1/2008 | | |
| EP | 1881259 A1 | 1/2008 | | |
| JP | 3145838 U | 10/2008 | | |
| JP | 2010-016223 A | 1/2010 | | |
| RU | 93929 U1 | 5/2010 | | |
| RU | 95180 U1 | 6/2010 | | |
| WO | WO 2008125191 A1 * | 10/2008 | ............. F21V 29/75 |
| WO | WO-2009140761 A1 | 11/2009 | | |
| WO | 2010031674 A1 | 3/2010 | | |
| WO | 2010038982 A2 | 4/2010 | | |
| WO | 2010089397 A1 | 8/2010 | | |
| WO | 20101900169 A1 | 9/2010 | | |

OTHER PUBLICATIONS

First Office Action dated Feb. 1, 2016 from Chinese Patent Application No. 201280020941.0.
Office Action dated Mar. 1, 2016 from Japanese Patent Application No. 2014-506969.
EPO as ISA, PCT/IB2012/052035 filed Apr. 23, 2012, "International Search Report and Written Opinion" dated Aug. 1, 2012, 10 pages.
Office Action, European Application No. 12720651.4, dated Apr. 5, 2016, 7 pages.
Office Action, Russian Application No. 2013152949, dated May 6, 2016, 9 pages.
Article 94(3) EPC dated Apr. 7, 2017, European Application No. 12 720 651.4-1757, 6 pages.
Second Office Action dated Dec. 20, 2016, China Patent Application No. 201280020941.0, 19 pages.
CN Office Action dated May 10, 2017, China Patent Application No. 201280020941.0, 22 pages.
Fourth Office Action dated Sep. 29, 2017, China Patent Application No. 201280020941.0, 22 pages.

* cited by examiner

LED LIGHTING DEVICE WITH LOWER HEAT DISSIPATING STRUCTURE

FIELD OF THE INVENTION

The present invention relates to a lighting device and to a lighting arrangement comprising a lighting device and a reflector.

BACKGROUND OF THE INVENTION

In the field of electrical lighting, LED (light emitting diode) elements are increasingly used due to their advantageous properties of high efficiency and long lifetime. Also, LEDs are already used for automotive lighting, including both automotive signalling lamps and automotive front lighting.

Important aspects in the design of an LED lighting unit comprise mechanical, electrical, optical, and thermal design. In terms of mechanical design, an LED lighting unit should have the necessary stability and fulfill dimensional requirements. According to electrical design aspects, the LED lighting unit should be compatible with and connectable to a given source of electrical power. Optical design requires sufficient luminous flux generated from LED elements and a spatial distribution of the luminous flux as required for the specific lighting task. Finally, thermal design requires that heat generated from operation of the LED elements is dissipated to maintain stable thermal operating conditions.

US 2011-0050101 describes a lighting system including a replaceable illumination module coupled to a base module. The illumination module comprises solid state lighting elements, such as LEDs, and a heat sink in thermal contact, which may have a plurality of heat fins. The heat sink may comprise a plurality of stacked extrusions with such heat fins, each having a respective radius, to form a stepwise tapered heat sink. In a preferred embodiment, the illumination module has a base connector to receive power from a lighting socket, and a driver circuit to receive power from the base connector and provide electrical power to the solid state lighting element on a printed circuit board.

SUMMARY OF THE INVENTION

It is an object of the present invention to provide a lighting device and lighting arrangement with a matched optical and thermal design, i. e. where both effective heat dissipation and an advantageous light intensity distribution are achieved.

This object is solved according to the invention by a lighting device of claim 1 and a lighting arrangement of claim 8. Dependent claims refer to preferred embodiments of the invention.

A central idea of the present invention is to provide a heat dissipating structure with a specially chosen shape and arrangement to minimize obstruction of light emitted from the LED element, in particular avoiding obstruction of light emitted into desired emission directions and limiting obstruction of light to selected portions which would otherwise be emitted into generally unused or less required emission directions.

A lighting device according to the invention comprises a base element for electrical contacting and mechanical mounting. Preferably, such a base element allows a replaceable mounting of the lighting device in a corresponding socket, e. g. for screw connection, bayonet coupling, plug-in connection etc. This in particular applies to LED retrofit lighting devices, i. e. a lighting device with LED elements intended to replace a prior art lamp, such as an incandescent lamp. The LED retrofit lighting device should in this case provide a mechanical and electrical interface at the base correspondingly to the lamp to be replaced.

The lighting device further comprises an LED arrangement with at least one LED element. The LED arrangement is spaced from the base element along a longitudinal axis, which preferably is a central longitudinal axis of the device. In the following description, the lighting device according to the invention will be described, as shown in the figures, with the longitudinal axis oriented vertically, where the base element is positioned below and the LED arrangement on top. As the skilled person will appreciate, this orientation will be used for ease of reference only and should not be construed as limiting the scope of protection.

The LED arrangement may comprise only a single LED element, i. e. a light emitting diode of any type. As will be discussed for preferred embodiments, an LED arrangement comprising more than one LED element may be preferred, in particular if different LED elements are arranged to emit light into different spatial directions to obtain a desired light emission distribution.

In order to dissipate heat generated in operation by the LED element and, if present, by other electronic components such as a driver circuit integrated within the lighting device, a heat dissipating structure is arranged between the base element and the LED arrangement.

This heat dissipating structure will in the following be referred to as a "lower" heat dissipating structure due to the fact that preferred embodiments, as will be discussed, may additionally contain a further, upper heat dissipating structure.

The lower dissipating structure according to the invention comprises a plurality of planar heat dissipation elements, or heat fins, made out of a heat conducting material. This heat conducting material is preferably a metal material such as aluminum, copper etc., but could alternatively also be a non-metallic material, such as a plastic material with sufficient heat conduction and heat radiation properties. Such properties will be discussed in detail below with reference to preferred embodiments.

The planar heat dissipation elements, or heat fins, are preferably arranged at least substantially perpendicular to the longitudinal axis of the lighting device. Here, the term "at least substantially perpendicular" should be understood to mean an angle of 90±25°, preferably 90±10°. This arrangement is particularly well suited for a lighting device intended to be operated in horizontal orientation, i. e. such that the planar heat dissipation elements are then oriented vertically to allow convection of air along the surfaces to allow effective cooling. In alternative embodiments, the heat dissipation elements need not be arranged perpendicular, but could be arranged in different directions and under different angles, including e. g. an arrangement parallel to the longitudinal axis.

According to the invention, the lower dissipating structure has a special shape with regard to its extension in cross-section, i. e. perpendicular to the longitudinal axis. In the preferred case of at least substantially circular shape in cross-section, this extension, measured by a diameter, is the same in all directions. In other possible shapes, such as elliptical, rectangular or other, the extension referred to may be measured in at least one direction as a distance from the central longitudinal axis. This direction should be a direction of light emission, i. e. an angle under which light from the LED arrangement is emitted to serve the lighting task.

According to the invention, this extension is not constant over the length of the longitudinal axis, but varies such that the extension at a first longitudinal position, closer to the LED arrangement than a second longitudinal position, is smaller than at the second position. Thus, in the first longitudinal position arranged close and preferably directly adjacent to the LED arrangement, the extension in cross-section is relatively small to minimize obstruction of light emitted from the LED arrangement, at least for the regarded light emission direction. At the second longitudinal position, which is located further away from the LED arrangement and is less critical for obstruction of light, the extension is larger, so that a relatively large surface area and effective heat dissipation may be achieved.

Thus, the lighting device according to the invention combines advantageous optical properties and effective heat dissipation. The specially designed shape of the lower heat dissipating structure allows a minimum of shading. The top of the lower heat dissipating structure, which is preferably arranged close to the LED arrangement, may provide a certain obstruction of the emitted light, but to a large portion this affects light which would be emitted into the direction of the base element, and could not be used for illumination anyway. In terms of thermal design, the special shape allows effective heat dissipation because the structure due to its special shape may be arranged quite close to the LED arrangement, and because at least at the second longitudinal position the larger extension provides a large surface area. As will be appreciated by a person of skill in the art, these advantages will be present even if, e. g. for any mechanical or other reasons, the lower heat dissipating structure comprises at a further longitudinal position, which may be even further distant from the LED arrangement than the first and second longitudinal position, an extension that is again smaller than one or both of the first and second extensions.

According to a preferred embodiment of the invention, the planar heat dissipation elements are arranged spaced form each other, preferably in parallel orientation, mounted to a common mounting rod. The central mounting rod may preferably be provided along the longitudinal axis and further preferred comprises at least a portion of a heat conducting material. The common mounting rod, which may e.g. have circular cross-section or any other elongated shape, may also serve as a pathway for electrical leads from the base element to the LED elements of the LED arrangement. In particular, a driver circuit may be arranged within the base element, electrically connected to the LED elements by one or more electrical leads extending through the central rod. In the case of integrated driver electronics, not only heat generated in operation by the LED elements, but also heat losses generated in a driver circuit may be dissipated by the lower heat dissipating structure.

The planar heat dissipation elements may be provided as circular disks. In preferred embodiments, 2-5, in particular preferred 3 separate heat dissipation elements of different extension in cross-section may be provided. It is further preferred for a plurality of planar heat dissipation elements to be arranged in stepped arrangement, i.e. with their extension decreasing along the longitudinal axis, i.e. such that the planar heat dissipation element with the smallest extension is arranged next to the LED arrangement, the largest planar heat dissipation element is arranged next to the base element, and any heat dissipation elements in between show a stepwise increasing extension in cross-section. In this preferred embodiment, the first longitudinal position thus corresponds to the position of the smallest diameter disk, which is closer to the LD arrangement than e. g. the second disk at the second longitudinal position, neighboring and parallel to the first disk, but at a distance and with a smaller diameter.

According to a further preferred aspect of the invention, the lighting device may additionally comprise an upper heat dissipating structure.

The upper heat dissipating structure may comprise one or more heat dissipation elements made out of a heat conducting material. It is shaped to include at least a first end and a second end spaced from the first end. The structure is oriented such that the first and second end are spaced along a traverse axis which is at least substantially perpendicular (preferably 90°±10°) to the longitudinal axis. The upper heat dissipating structure is arranged relative to the LED arrangement such that the LED arrangement is placed between the first and second end thereof. Thus, the upper heat dissipating structure is positioned, in terms of its arrangement along the longitudinal axis, at the same height as the LED arrangement, and preferably even extending above the LED arrangement, to achieve heat fins in strong thermal contact for excellent heat dissipation properties. In addition, the LED arrangement enclosed between the first and second end may be mechanically protected.

Preferably, the upper heat dissipating structure has an elongated shape, i.e. a shape, as viewed in cross-section perpendicular to the longitudinal axis, where the width of the upper heat dissipating structure is smaller than its length extending between the first and second ends. Particularly preferred, the overall width is substantially smaller than the length, i.e. the outer dimensions are such that the length is at least twice as large as the width, in some embodiments even more than 5 or 10 times.

As will become apparent in connection with detailed embodiments below, the upper heat dissipating structure may comprise at least two heat dissipating elements spaced from each other, or may alternatively comprise one element extending between the first and second ends thereof.

In a lighting arrangement according to the invention, a lighting device as described above is used in connection with a reflector.

The reflector comprises a hollow reflector body with an inner concave reflector surface. A mounting opening is provided in the reflector body, where a lighting device as described above is mounted such that its LED arrangement is arranged within the reflector body and illuminates the inner reflector surface, which has a shape—e.g. paraboloid, elliptical or specially designed complex shape—in order to form an emitted beam out of the light emitted from the LED arrangement.

BRIEF DESCRIPTION OF THE DRAWINGS

The above and other features, object and advantages of the present invention will become apparent from the following description of preferred embodiments, in which:

FIG. 8 shows the lighting device of FIGS. 5-7 in a cross-sectional view along the line B . . . B of FIG. 7;

DETAILED DESCRIPTION OF EMBODIMENTS

Figure 14:
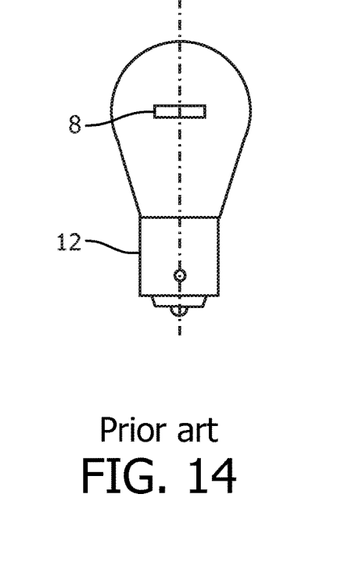
FIG. 14 shows a prior art halogen lamp.

FIGS. 1-4 show an LED lighting device 10, or LED lamp, which is intended to replace a prior art incandescent lamp for use as an automotive signalling lamp as shown in FIG. 14. As the prior art halogen, the LED lamp 10 comprises a base 12 with a metal cylinder 16 including a locking protrusion 18 for forming a bayonet coupling including a positioning reference. The metal cylinder 16 and a further end contact 14 also form electrical contacts 14, 16 for supply of electrical power to the lamp. The LED lamp 10 is shown in the figures in upright position, i. e. with a longitudinal axis L oriented vertically. As the skilled person will recognize, the orientation will be referred to only for reference, whereas the lamp 10 may be operated in other orientations, and will even preferably be operated in horizontal orientation in a lighting unit 50 as shown in FIG. 15.

Figure 15:
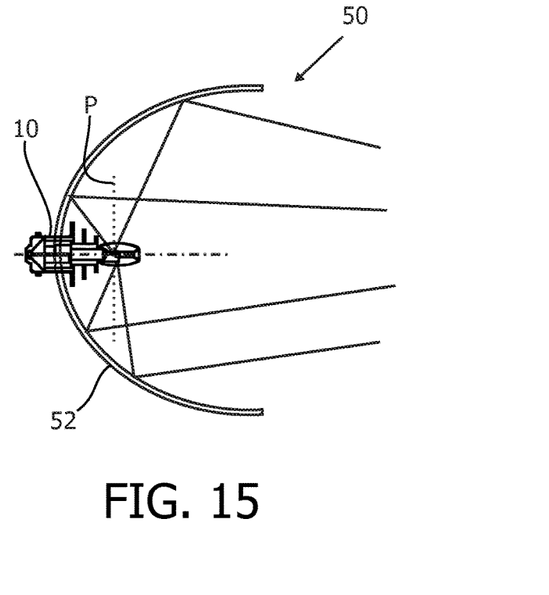
FIG. 15 shows a lighting system including a lamp and a reflector.

In a prior art lighting unit, a lamp as shown in FIG. 15 is mounted to a reflector 52 to protrude into the inner reflector space so that a wound filament 8, from which light is emitted, is located at a specified position within the reflector. This positioning, which is necessary to achieve a desired light distribution of the beam emitted from the lighting unit 50, is achieved by a specified position of the filament 8 with regard to the reference flange 16.

In the LED lamp 10 intended to replace the prior art lamp of FIG. 14, an LED arrangement 20 is mounted at a distance from the base 12 along the longitudinal axis L. The LED arrangement 20 comprises in the example shown two separate LED elements 70 arranged relative to each other spaced at least in a transversal direction along a traverse axis T.

In designing an LED lamp 10 with an LED arrangement 20 to replace a prior art lamp, the aim is to achieve as closely as necessary (within the boundaries given by automotive specifications) the prior light distribution. On the other hand, the LED arrangement 20 emitting the light should in its outer dimensions come close to the wound filament 8 of prior art lamps, and be arranged at the same relative position to the base 12.

The prior art lamp is an incandescent lamp comprising a tungsten filament 8. To replace the prior art lamp of FIG. 14, the LED lamp of FIGS. 1-4 includes in the LED arrangement 20 two LED elements 70. Each of the LED elements 70 is comprised of a rectangular, planar carrier plate and an LED chip mounted thereon. In the preferred case of LED elements 70 without primary optics, the light emission is close to a Lambertian emitter, i. e. with a central, main light emission direction centrally perpendicular to the carrier plate.

Figure 1:
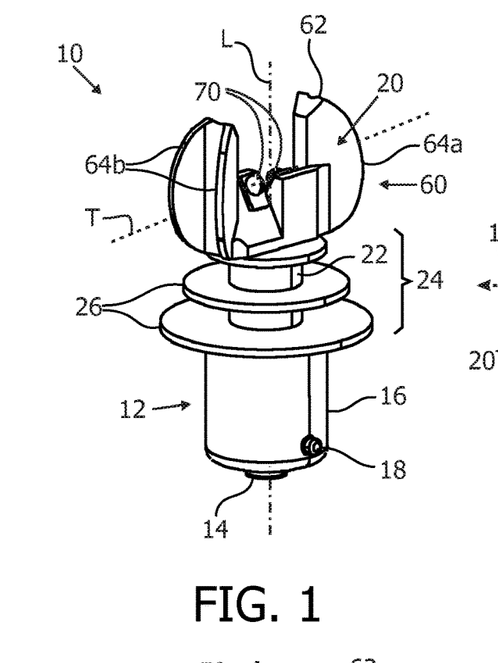
FIG. 1 shows a perspective view of a lighting device according to a first embodiment of the invention.

The LED elements 70 are mounted in parallel to the traverse axis T, i. e. the planes defined by the surfaces of the carrier plates are parallel to the axis T, as shown in FIG. 1.

The LED elements 70 are arranged, with respect to the traverse axis T, to enclose a rotation angle. Additionally, the LED assemblies 70 are arranged in offset configuration, i. e. linearly displaced in a direction parallel to the traverse axis T. In the example shown, the LED elements 70 are arranged right next to each other, i. e. the offset between them is about equal to the length of the LED elements 70. Thus, the LED elements 70 are arranged close to each other to form a compact light emitting structure. The rotation angle, under which the LED elements 70 are arranged, leads to a light angle defined between the main light directions of the LED elements. Further, in the example shown, the LED elements 70 are provided in mirrored configuration, such that their main light emisison directions are—in the view along the longitudinal axis L—facing in opposite directions from the traverse axis T.

In the design of the LED lamp 10 to replace the prior art lamp shown in FIG. 14, the traverse axis T is positioned in parallel to the location of the wound filament 8 of the prior art lamp. The LED arrangement 20 is located, by reference to the base 12, at the same position as the filament in the prior art lamp.

In operation of the lamp 10 inserted in a suitable socket (not shown), electrical power is supplied via the electrical connectors 14, 16. An electrical driving circuit 40 (FIG. 4) on a printed circuit board 42 integrated in a cavity of the base 12 provides a DC electrical driving current. The LED elements of the LED arrangement 20 are connected to the driver circuit 40 by electrical wires 41 extending through a hollow center of the mounting rod 22, and may be thus operated to emit light.

During operation, heat is generated in the LED lamp 10 due to electrical losses in the driver circuit 40 and LED arrangement 20. In order to dissipate the heat, both an upper heat dissipating structure 60 and a lower heat dissipating structure 24 are provided.

The lower heat dissipating structure 24 comprises disks 26 arranged in parallel and spaced from each other in direction of the longitudinal axis L of the lamp 10. In the preferred example shown, three disks 26 are provided. The disks 26 are mounted on a mounting rod 22. As the mounting rod 22, the disks 26 consist of a metal material of high thermal conductivity, such as e. g. copper or aluminum. Thus, heat generated from the driver circuit in the base 12 and from the LED arrangement 20 is dissipated via the mounting rod 22 and dishes 26 of the lower heat dissipating structure 24.

Figure 4:
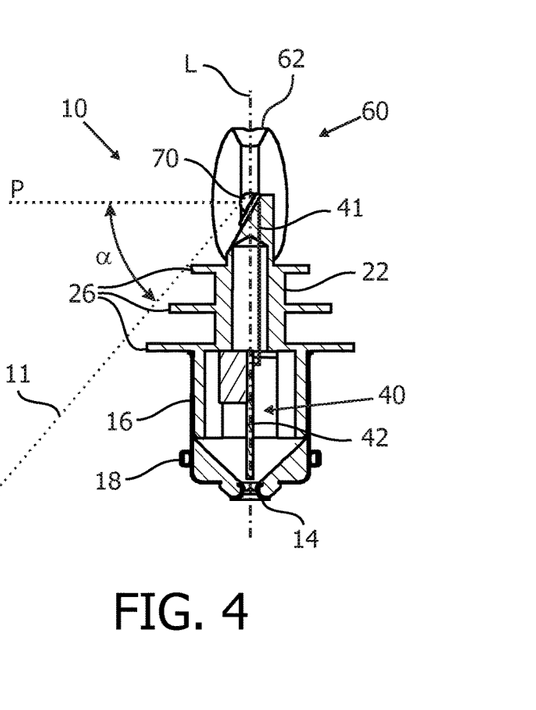
FIG. 4 shows the lighting device of FIGS. 1-3 in a cross-sectional view along the line A . . . A of FIG. 3.
Figures 5, 6:
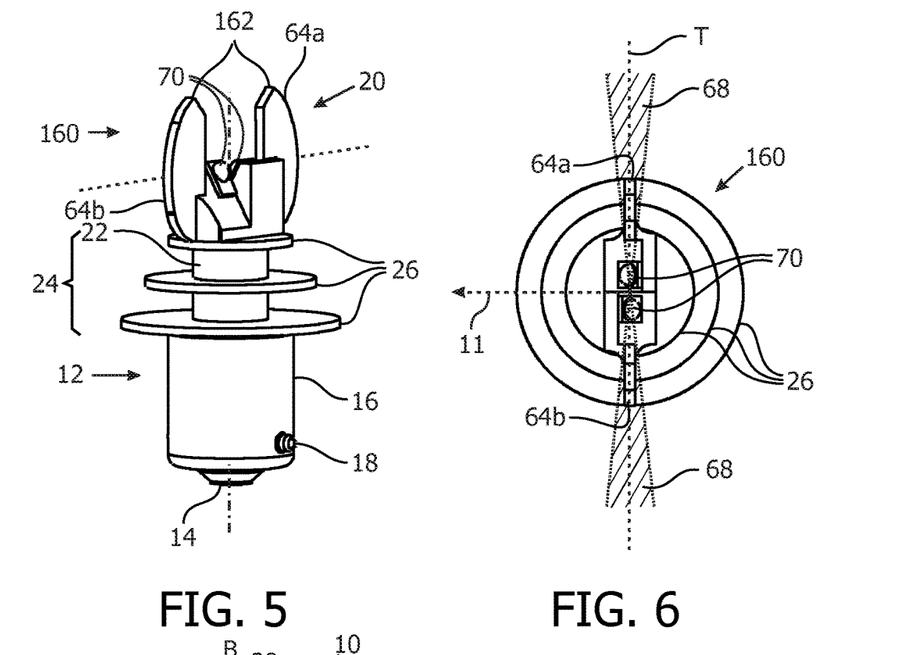
FIG. 5 shows a perspective view of a lighting device according to a second embodiment of the invention.
FIG. 6, 7 show a top view and a side view of the lighting device of FIG. 5.
Figures 7, 8:
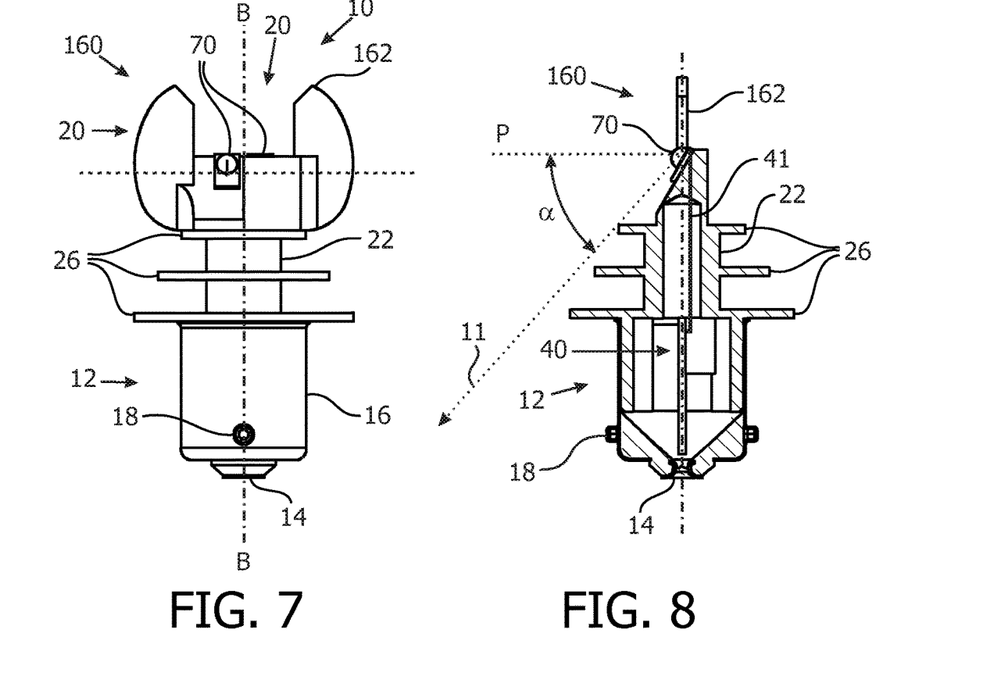
Figure 9:
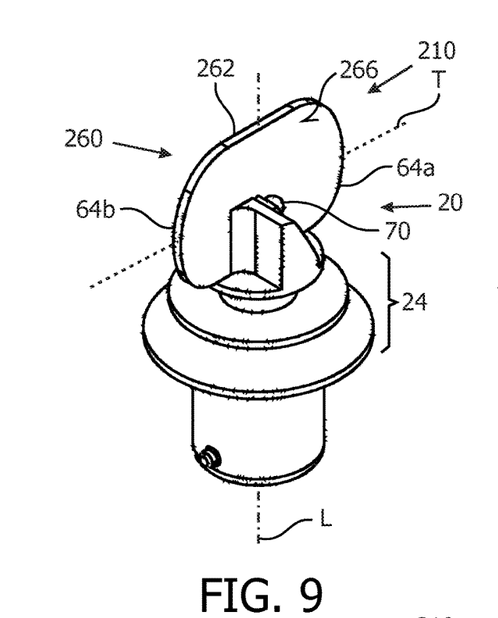
FIG. 9 shows a perspective view of a lighting device according to a third embodiment of the invention.
Figure 10:
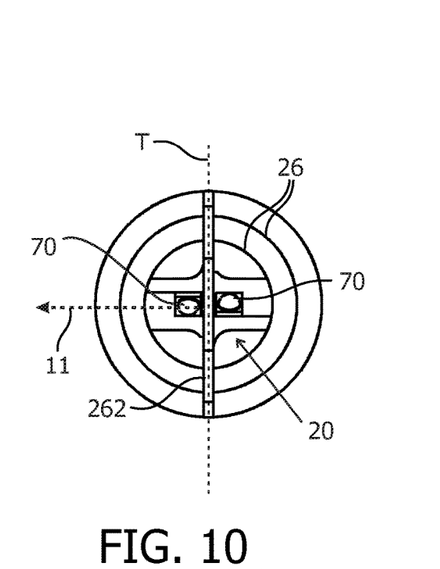
FIG. 10, 11 show a top view and a side view of the lighting device of FIG. 9.
Figure 11:
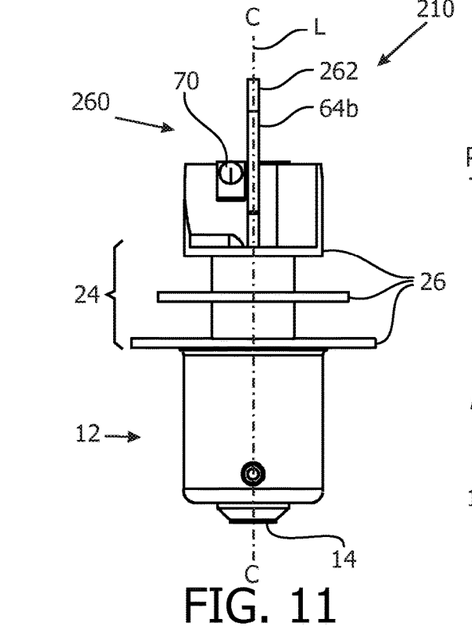
Figure 12:
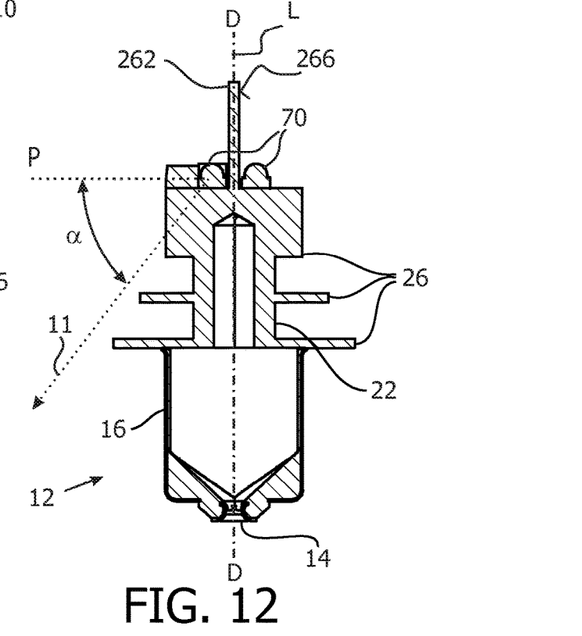
FIG. 12 shows the lighting device of FIGS. 9-11 in a cross-sectional view along the line C . . . C of FIG. 11.

As illustrated in FIG. 4, the diameter of the disks 26, and their spacing from the LED arrangement 20 is chosen to leave a lighting angle α, defined between a horizontal plane P and a light emission direction 11 free from obstructions. Thus, light emitted from the LED arrangement 20 is not obstructed by the lower heat dissipating structure 24 below the plane P in directions 11 within an interval defined by the angle α. The angle α, which in the shown example is about 60°, may be chosen according to the specification of the required LED lamp, e. g. in a range of 20-70°.

Figure 18:
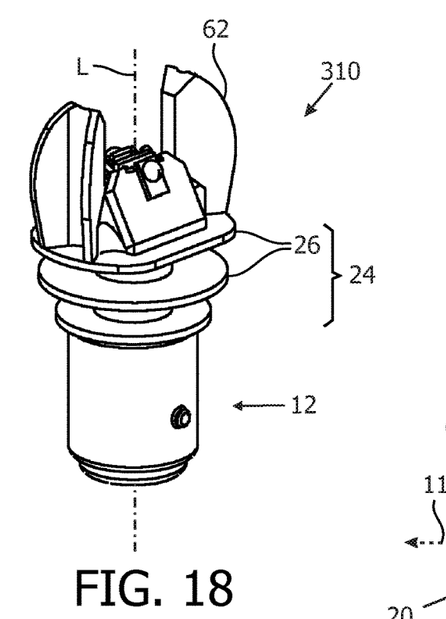
FIG. 18 shows a perspective view of a lighting device according to a fourth embodiment of the invention.

In the preferred example shown in FIGS. 1-4, the disks 26 have circular cross-section. Thus, in all radial directions, the extension, i. e. distance of the outer edge from the central longitudinal axis L, will be the same. In alternative embodiments, such as shown in FIG. 18, 19, the disks 26 may have a cross-section different from a circular shape.

The first, smallest of the disks 26 is arranged close to the LED arrangement 20 and thus in good thermal contact. Due to its small diameter, it leaves a relatively large angle α of light emission directions unobstructed. The further disks 26 are arranged at different longitudinal positions further away from the LED arrangement 20. Due to their larger diameter, they provide a relatively large surface area for good heat dissipation. Since their longitudinal positions are at a greater distance from the LED arrangement 20, this larger diameter does not lead to a smaller angle α, and therefore a larger amount of light obstruction.

Next to the LED arrangement 20, the LED lamp 10 further comprises the upper heat dissipating structure 60.

The upper heat dissipating structure 60 comprises in the first embodiment two spaced heat dissipating elements 62. Each of the heat dissipating elements 62 is comprised of two planar heat fins, arranged under an angle of approximately 60°. At the outer ends, each of the heat fins has an arcuate edge 64a, 64b. These edges 64a 64b thus form outer ends of the upper heat dissipating structure 60, which are arranged spaced from each other along a traverse axis T perpendicular to the longitudinal axis L.

The upper heat dissipating structure 60 is arranged right next to the LED arrangement 20, such that the LED arrangement 20 is in between the two heat dissipating elements 62. Thus, the heat dissipating elements 62 are arranged very close to and in good thermal contact with the LED arrangement and are therefore well disposed to provide effective heat dissipation.

In terms of the longitudinal position, i. e. position along the longitudinal axis L, the heat dissipating elements 62 of the upper heat dissipating structure 60 are thus arranged at least as high as the LED arrangement 20 itself, and, as shown in FIGS. 1-4, preferably even beyond, i. e. extending along the longitudinal axis L higher than the LED arrangement 20. By this arrangement, the upper heat dissipating structure 60, besides dissipating heat from the LED elements, also partly shields the LED arrangement 20 from direct touch when handling the LED lamp 10, and thus provides mechanical protection.

The shape of the upper heat dissipating structure 60 is chosen to minimize obstruction of light emitted from the lamp 10, and in particular of such portions of the light which are used in the lighting system 50.

Figure 2:
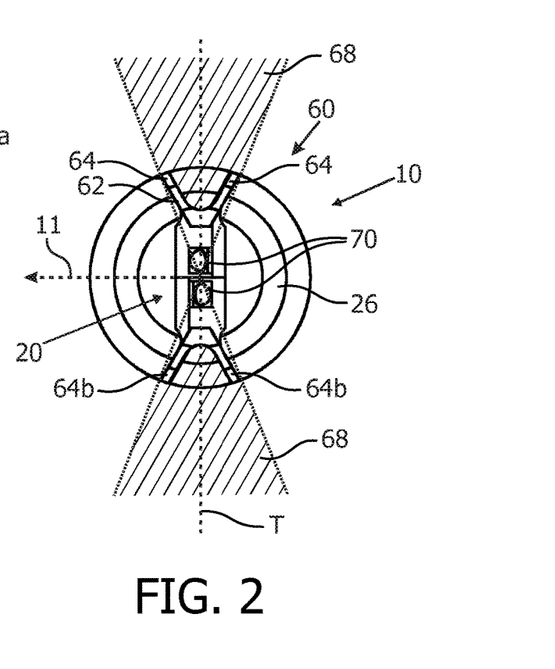
FIG. 2, 3 show a top view and a side view of the lighting device of FIG. 1.
Figure 3:
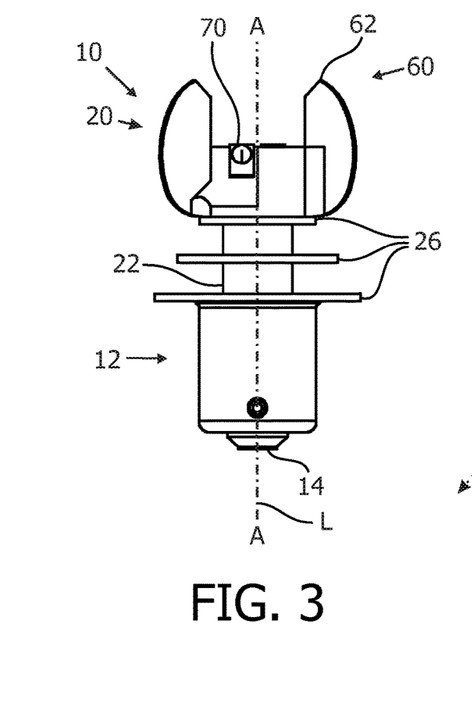

By the arrangement of the upper heat dissipating structure 60 at the same longitudinal position as the LED arrangement 20, a certain amount of shading will result. For the embodiment of FIGS. 1-4, this is illustrated in FIG. 2 by hatched shading areas 68. As the skilled person will appreciate, the shown shading angle, which in the embodiment of FIGS. 1-4 have a value of approximately 50°, is shown from a central point of the LED arrangement 20, coincident with the longitudinal axis L. Since the individual LED elements 70 are slightly offset from this central position along the traverse axis T, actual shading will slightly differ. Still, the shading angle (hatched areas 68) may serve as a measure for the amount of shading by the heat dissipation elements 62 of the upper heat dissipating structure.

As particularly visible in the view of FIG. 2 along the longitudinal axis L, the shape of the light dissipating elements 62 is relatively narrow to achieve a limited shading angle. The overall shape of the upper heat dissipating structure 60 in this view is an elongate shape, i. e. the length extending parallel to the traverse axis T between the edges 64a, 64b is greater than its width, i. e. its extension to both sides of the traverse axis T. In the shown example, the length, i. e. distance between the edges 64a, 64b, is about 2.5 times larger than the width, leading to the discussed shading angle of about 50°.

In order to replace a prior art lamp, the LED lamp 10 is designed to provide a light emission from the LED arrangement 20 which—after shading at the upper and lower heat dissipating structures 24, 60—comes close enough to the light emission from a prior incandescent lamp to fulfil relevant requirements of automotive regulations. Besides the size of the light emitting structure, i. e. the LED arrangement 20, a decisive requirement is the spatial light distribution, i. e. how the intensity of the light emitted from the LED arrangement 20 is distributed into different lighting directions. Here, in design special care should be taken to distinguish between light emission directions, or beam portions, used in a lighting system 50 as shown in FIG. 15 to form a resulting beam from those light emission directions, and beam portions, which do not contribute substantially to the resulting beam. FIG. 15 shows schematically which portions of the light emitted from the lamp 10 are mainly used by the reflector 52 to form a resulting beam pattern. It thus becomes apparent for the specific lighting task shown, that portions of the light emitted from the lamp 10 into angles of greater than α under the reference plane P, for example, would not substantially contribute to the resulting beam, such that shading of these light portions may be tolerated.

The spatial distribution of light emitted from the lamp 10 may be observed in the reference plane P, shown in FIGS. 1-4 oriented horizontally, i. e. perpendicular to the longitudinal axis L of the lamp 10, or, alternatively, in a perpendicular plane such as shown by the line A . . . A in FIG. 3.

Figure 16:
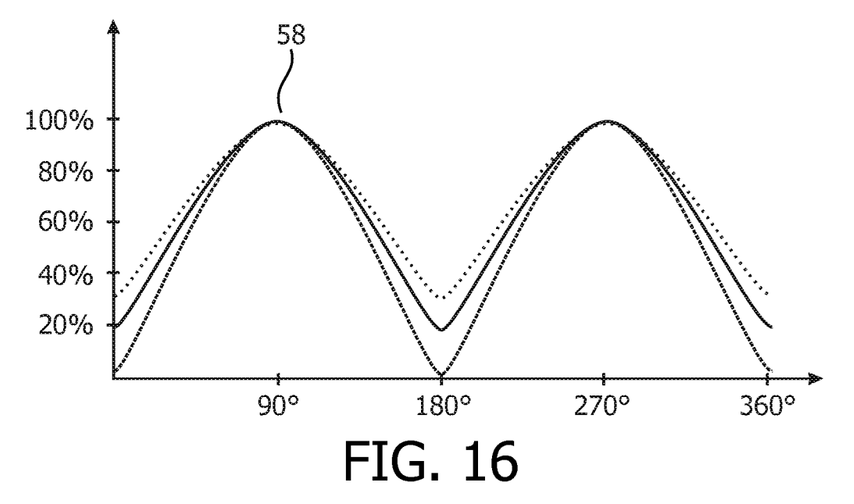
FIG. 16 shows a diagram of an intensity distribution in a horizontal plane for embodiments of lighting devices.
Figure 17:
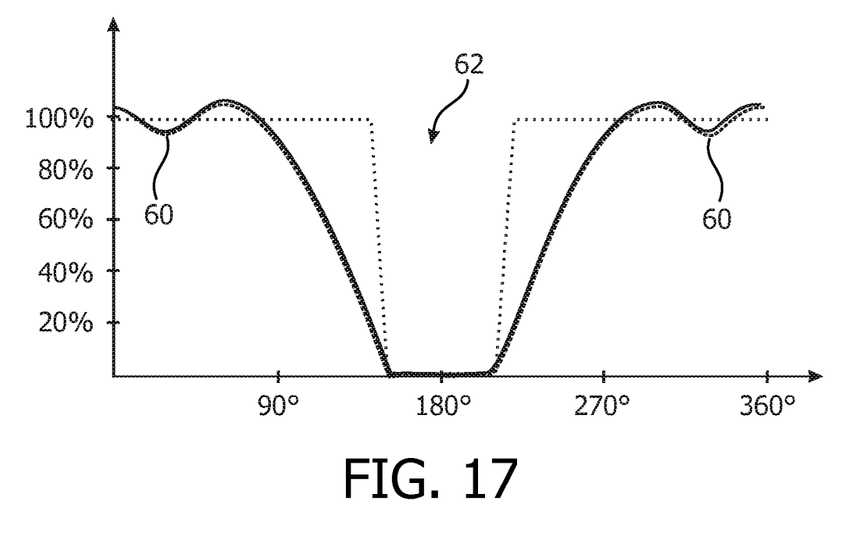
FIG. 17 shows a diagram of an intensity distribution in a vertical plane for embodiments of lighting devices.

FIG. 17 shows the intensity distribution of light emitted from the lamp 10 under angles of 0-360° in the vertical plane A . . . A, whereas FIG. 16 shows the corresponding intensity distribution under angles of 0-360° in the horizontal reference plane P. Shown in a dotted line as a reference is in both cases the intensity distribution of a prior art lamp (where values measured in candela are normalized, so that the maximum intensity of the prior art halogen lamp is shown, as a value of 100%). In FIGS. 16 and 17, the intensity distribution of light emitted from the lamp 10 according to the embodiment of FIGS. 1-4 is shown as a dashed line. In the horizontal plane P, the intensity distribution of the LED lamp 110 of FIGS. 1-4 shows two maxima 58 at angles of 90° and 270°, i. e. perpendicular to the traverse axis T and to the LED elements 70. Shading by the heat dissipating elements 62 occurs only under angles of around 0° and 180°, i. e. in directions where the light intensity is already at a minimum. As such, the intensity distribution in the horizontal plane P approximates that of the prior art incandescent lamp (FIG. 14), where the tungsten filament 8 emits light of relatively small intensity in its longitudinal direction.

In the vertical plane (FIG. 17), parallel to the longitudinal axis L, light emission of a lamp 10 according to the first embodiment shown as a dashed line has a central minimum 62, where light is shaded at the lower heat dissipating structure 24. Under angles of between 200° and 330° no light emission is required, so that this shading is no problem.

Additional dips 60 are noticeable where light from one LED chip 140 is shaded at the other, respectively. Still, the intensity distribution of the prior art lamp (dotted line) is approximated to a sufficient degree.

FIGS. 5-8 show an LED lighting device, or LED lamp 110 according to a second embodiment. As will be appreciated, the LED lamp 110 according to the second embodiment corresponds in large parts to the LED lamp 10 according to the first embodiment. Consequently, the following description will focus on differences between the embodiments. Parts alike among the embodiments will be referenced by the same reference numerals.

The LED lamp 110 according to the second embodiment differs, as visible from FIGS. 5-8, from the first embodiment by the shape of the upper heat dissipating structure 160. As in the first embodiment, two separate heat dissipating elements 162 with arcuate edges 64a, 64b are provided on both sides of the LED arrangement 20. The upper heat dissipating structure 160, however, has a shape that is even more narrow and thus achieves, as visible in particular from FIG. 6, a substantially smaller shading angle of less than 15°, so that the shaded portions 68 of the light emitted in the horizontal reference plane P are substantially smaller (hatched portions 68 in FIG. 6).

The heat dissipating elements 162 are each planar elements, shaped as approximately half disks, arranged parallel to the traverse axis T, such that both LED elements 70 are arranged in between. They extend longitudinally above the LED arrangement 20, so that a certain mechanical shielding is also achieved.

The resulting light distribution is shown in FIG. 17 (vertical plane) and FIG. 16 (horizontal reference plane P) as a solid line. As visible here, the obstruction in the horizontal plane (FIG. 16) due to the thinner upper heat dissipating elements 162 arranged under angles of 0° and 180° is substantially less than for the first embodiment. In the vertical plane (FIG. 17) the distribution is about equal to the first embodiment.

FIGS. 9-13 show an LED lighting device, or LED lamp, 210 according to a third embodiment. Again, differences between the third embodiment and the first and second embodiments will be explained, with like reference numerals for like parts.

The LED lamp 210 according to the third embodiment differs from the previous embodiments by the shape of the upper heat dissipating structure 260, which does not comprise two separate heat dissipating elements but only a single, planar heat dissipating element 262 extending along the traverse axis T. Arcuate edges 64a, 64b form the longitudinal ends of the heat dissipating element 262.

As in previous embodiments, an LED arrangement 20 comprises two individual LED elements 70 arranged at a distance from each other. The LED elements 70 are arranged offset perpendicular to the traverse axis T, so that they are arranged on both sides of the heat dissipating element 262.

As visible from FIGS. 9-13, in the third embodiment the LED elements 70 are not spaced along the traverse axis T running through the arcuate edges 64a, 64b. Also, the individual LED elements 70 with their planar carrier plates are arranged to face, if viewed along the longitudinal axis L (FIG. 10), in opposite directions parallel to the traverse axis T.

In the LED lamp 210 according to the third embodiment, the heat dissipation element 262 has, besides its heat dissipation function, also an optical function other than shading. Both surfaces 266 of the planar heat dissipation element 262 are high polished aluminum surfaces to obtain specular reflectivity, in order to act as reflective surfaces for light emitted from the LED elements 70. However, high polished aluminum has a rather low thermal emissivity coefficient. For example, while a thermal emissivity coefficient of non-polished aluminum heat fins may be as high as 0.8, specular polished aluminum may have an emissivity coefficient as low as 0.05. In order to be able to use specular reflective properties of aluminum, it is therefore preferred to coat the surface 266 with a thin layer of a transparent coating to achieve a heat emissivity coefficient of around 0.6 or even higher. The transparent coating may be a transparent lacquer, for example Rust-Oleum High Temperature Top Coating 2500.

Figure 13:
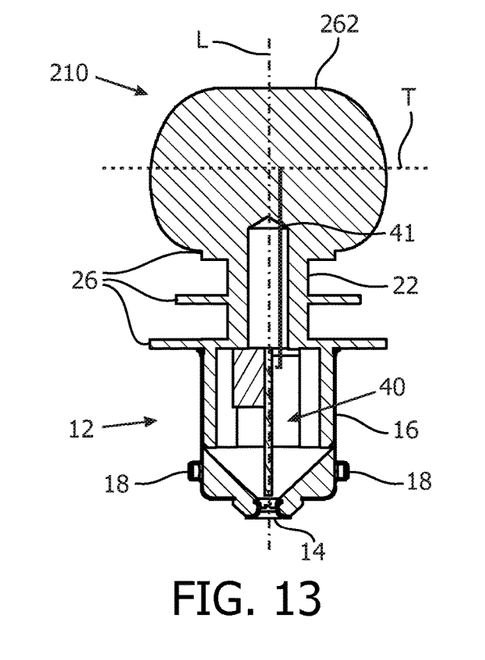
FIG. 13 shows the lighting device of FIGS. 9-12 in a cross-sectional view along the line C . . . C of FIG. 12.
Figure 13A:
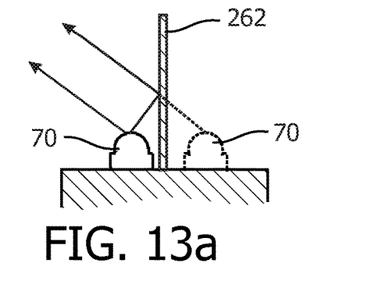
FIGS. 13a, 13b show symbolical representations of optical effects in the embodiment according to FIGS. 9-13.

FIG. 13a schematically shows the optical effect achieved by reflection of light from a single LED element at the specular reflective side surface 266 of heat dissipating element 262. Viewed from one side, reflection at the surface 266 will make the LED arrangement 20 appear to have two LED elements 70—light reflected at the surface 266 will appear as a second, virtual LED element mirrored at the surface 266. Since in preferred embodiments LED elements 70 will be provided on both sides, the LED arrangement 20 will appear under all angles to emit light from two separate LED elements, although the two physical LED elements 70 are separated by the heat dissipation element 262.

Figure 13B:
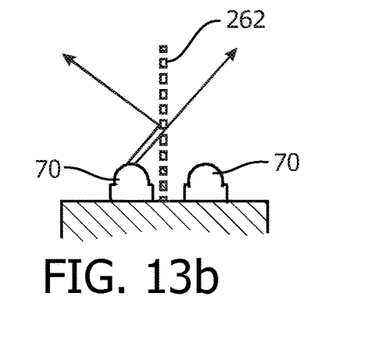

FIG. 13b shows an optical effect of a further embodiment, where heat dissipating element 262 comprises a structure of small holes so that it acts as a 50% mirror. 50% of the light incident on the surface 266 are reflected and another 50% are transmitted through the holes. In this alternative embodiment, both LED elements 70 will illuminate into all light emission directions.

Although the invention has been illustrated and described in detail in the drawings and foregoing description, such illustration and description are to be considered illustrative or exemplary and not restrictive; the invention is not limited to the disclosed embodiments.

For example, it is possible to use different configurations of the LED arrangement 20, e. g. with only one LED element 70, or with more than two LED elements. If two LED elements are used as in the embodiments discussed above, their arrangement may differ from the shown embodiments. For example, while in the first and second embodiment the LED elements 70 are slightly offset perpendicular to the traverse axis T, they may alternatively be arranged exactly in line along the traverse axis T, or may be even further offset.

Figure 19:
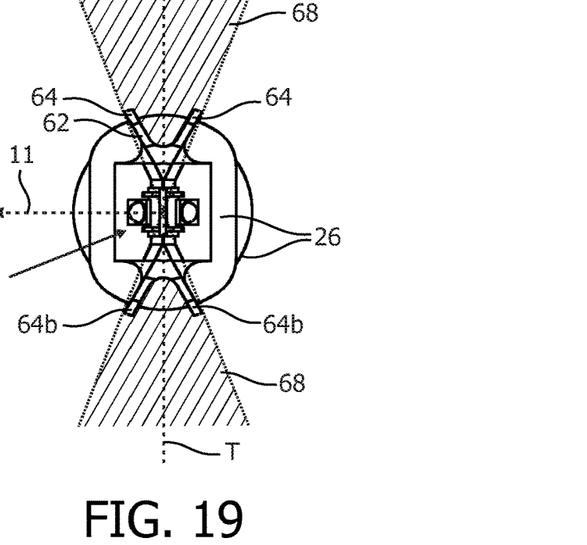
FIG. 19 shows a top view of a lighting device of FIG. 18.
Figure 20:
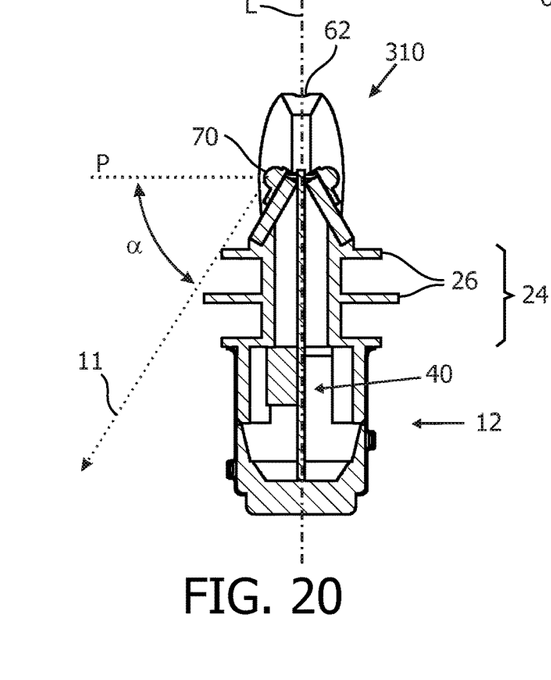
FIG. 20 shows a lighting device of FIGS. 18, 19 in a cross-sectional view.

As a further variation of the above embodiments, FIGS. 18-20 show an alternative fourth embodiment of an LED lamp 310, which corresponds to the LED lamp 10 according to the first embodiment, but with one of the disks 26 of the lower heat dissipating structure 24 having a different shape. In contrast to the first embodiment, the disk 26 located closest to the LED arrangement 20 is not of circular, but of rounded rectangular shape. However, in the light emission direction 11 as shown in FIGS. 19, 20, the disks 26 still show a smaller extension of the highest, rectangular disk 26 than—measured in the same direction 11—the lower, circular disk 26. Thus, in the same way as in the first embodiment, a lighting angle α in the plane parallel to the light emission direction 11 and the longitudinal axis L is left without obstruction, so that light may be freely emitted.

In the fourth embodiment, the third disk 26, located closest to the base 12, again has a smaller extension as visible from FIG. 20.

Other variations of the disclosed embodiments can be understood and effected by those skilled in the art in practicing the claimed invention, from a study of the drawings, the disclosure and the appended claims. In the claims, the word "comprising" does not exclude other elements, and the indefinite article "a" or "an" does not exclude a plurality. The mere fact that certain measures are recited in mutually different dependent claims or disclosed in mutually different embodiments in the above detailed description does not indicate that a combination of these measures cannot be used to advantage. Any reference signs in the claims should not be construed as limiting the scope.

The invention claimed is:

1. A lighting device, comprising
a base element for electrical contacting and mechanical mounting;
an LED arrangement spaced from said base element along a longitudinal axis (L) of the lighting device; and
a heat dissipating structure, comprising:
a lower heat dissipating structure being arranged between said base element and said LED arrangement, said lower heat dissipating structure comprising a plurality of planar heat dissipation elements made out of a heat conducting material, said planar heat dissipation elements being arranged at least substantially perpendicular to said longitudinal axis (L), wherein:
said planar heat dissipation elements have extensions in cross-sections, measured in at least one radial direction from said longitudinal axis (L);
said extensions decrease along said longitudinal axis (L) in a direction from said base element to said LED arrangement;
a light emission direction (11) is defined by a line connecting at least one LED element of said LED arrangement with an outer edge of a planar heat dissipation element closest to said LED arrangement;
a lighting angle (α) is defined between a plane (P) perpendicular to said longitudinal axis (L) and said light emission direction (11);
said extensions in cross-sections of said planar heat dissipation elements and their spacing in direction of said longitudinal axis (L) are chosen to leave light emitted from said LED arrangement free from obstructions by said lower heat dissipating structure below said plane (P) in directions within an interval defined by said lighting angle (α).

2. The lighting device according to claim 1, wherein said planar heat dissipation elements are arranged spaced from each other, mounted to a common mounting rod.

3. The lighting device according to claim 1, wherein said planar heat dissipation elements are provided as circular discs.

4. The lighting device according to claim 1, wherein said base element comprises at least one electrical contact, and wherein a driver circuit is arranged within said base element, said driver circuit being electrically connected to LED elements of said LED arrangement for providing electrical power thereto.

5. The lighting device according to claim 4, wherein said driver circuit is connected to said LED elements by electrical leads extending through a central rod of said lower heat dissipating structure.

6. The lighting device according to claim 1, further comprising an upper heat dissipating structure being arranged next to said LED arrangement, wherein said upper heat dissipating structure includes at least a first end and a second end spaced from said first end along a traverse axis perpendicular to said longitudinal axis, and wherein said LED arrangement is arranged between said first and second ends.

7. The lighting device according to claim 1, further comprising an upper heat dissipating structure being arranged next to said LED arrangement, wherein said upper heat dissipating structure includes at least a first end and a second end spaced from said first end along a traverse axis perpendicular to said longitudinal axis.

8. The lighting device according to claim 7, wherein said upper heat dissipating structure comprises a single planar heat dissipating element.

9. The lighting device according to claim 7, wherein said upper heat dissipating structure comprises two heat dissipating elements spaced from each other.

10. The lighting device according to claim 7, wherein said first or said second end are arcuate.

11. The lighting device according to claim 1, further comprising an upper heat dissipating structure being arranged next to said LED arrangement, wherein said upper heat dissipating structure comprises at least two planar heat fins.

12. The lighting device according to claim 1, wherein said light emission direction (11) and said plane (P) define an angle from 20 to 70 degrees.

13. The lighting device according to claim 12, wherein said angle is 60 degrees.

14. The lighting device according to claim 1, wherein said planar heat dissipation element closest to said LED arrangement comprises a rounded rectangular shape and said light emission direction (11) is directed at a straight edge of said planar heat dissipation element closest to said LED arrangement.

15. The lighting device according to claim 1, wherein the LED arrangement includes first and second LED elements each comprising a planar carrier plate and a LED chip mounted on said planar carrier plate, each planar carrier being arranged at greater angles relative to said plane (P) than said lighting angle (α).

16. A lighting arrangement comprising:
a lighting device according to claim 1; and
a reflector body with an inner concave reflector surface and a mounting opening, where said lighting device is mounted in said mounting opening such that said LED arrangement is arranged within said reflector body and light emitted from said LED arrangement is reflected by said inner reflector surface.

17. The lighting arrangement of claim 16, wherein said lighting device is an automotive lamp placed horizontally in said reflector body.

* * * * *